Inventor:
John P. May,
by Roe D. McBurnett
His Attorney.

United States Patent Office 2,823,619
Patented Feb. 18, 1958

2,823,619

RADIAL TYPE HYDRAULIC UNIT

John P. May, Schenectady, N. Y., assignor to General Electric Company, a corporation of New York Application July 16, 1956, Serial No. 598,149

1 Claim. (Cl. 103—161)

The present invention relates to a radial type hydraulic unit and more particularly to a radial type hydraulic unit having swung cylinders with reduced cylinder wall forces.

Presently used radial type hydraulic units, such as hydraulic pump units employing ball pistons reciprocating within cylinders, are characterized by occurrence of severe wear and leakage problems and successful operation depends, to a large extent, on the utilization of expensive construction materials in an attempt to overcome these deficiencies. If presently known ball piston units are operated both as a pump and as a motor, detrimental power losses are incurred at such a condition of operation which tends to produce instability in the system.

This condition of operation occurs in hydraulic differential constant speed drives near the straight-through speed, which is defined as the condition when the differential speed between the input and output is zero. The input unit is commonly referred to as the A-end and the output unit as the B-end. At this condition, the reversal of the torque loss and the steep negative slopes of such losses at the output zero speed tends to cause the detrimental instability of the drive. Further, the coaction between the ball piston and its cylinder creates high side wall forces which greatly reduce the efficiency of such units.

The present invention provides a radial type hydraulic unit with cylinders in which the axes are nonradial relative to the unit and the center lines of the cylinders are swung to an optimum angle as determined by the unit and by expected operating conditions so that the piston or ball forces on the cylinder walls will be reduced. A cylinder bore in a cylinder block of a radial type hydraulic unit which is characterized by a bore axis which is angularly swung from the radial line of the cylinder block is hereinafter termed the "swung cylinder."

Although the invention can be applied to any radial type hydraulic units, a ball type hydraulic unit will be utilized to facilitate disclosure of the present invention. The invention further provides a hydraulic unit wherein lubrication is improved, leakage reduced and the race forces minimized. The cylinders can be swung from the center line of the cylinder block at an angle which will make the cylinder wall forces such that the ball will ride toward the forward wall, the aft wall, or alternate between them. The force change remains constant, but the distribution relative to the forward and aft walls changes for different cylinder angles. The result is that a cylinder angle can be selected which will result in the maximum force being at least one-half of the value when the cylinder is not swung from the center line of the cylinder block.

The leakage past a rotating ball is much less when it is riding forward in the cylinder. Lubrication which tends to reduce friction and wear between the rotating ball and the cylinder wall when the ball is riding forward is improved since oil is being wiped into the place of closest contact. Also, race forces are reduced in the present swung cylinder units since reduced wall force components exist and since tangential friction forces between the ball and cylinder wall subtract from the race forces. Further, as forces increase between the ball and wall, the situation tends to be self-relieving when the ball is riding forward. Consequently, the present invention sets forth the following improvements, among many, in that the cylinder wall forces are reduced, race forces are minimized, leakage is reduced and lubrication improved. Further, since the angles that the cylinders are swung from the center line of the cylinder block are small, no manufacturing problem is anticipated and, with the use of less expensive material, an economical and highly efficient radial type hydraulic unit is possible.

An object of the present invention is the provision of a radial type hydraulic unit having reduced cylinder wall forces, improved lubrication, reduced leakage, and reduced race force.

Another object is to provide a radial type hydraulic unit wherein the hydraulic piston will ride toward the forward wall and the aft wall and alternate therebetween to substantially reduce cylinder wall forces.

A further object of the invention is the provision of a radial type hydraulic unit operating both as a pump and as a motor through zero speed having low torque losses and low side wall forces between the ball piston and its cylinder.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 4:
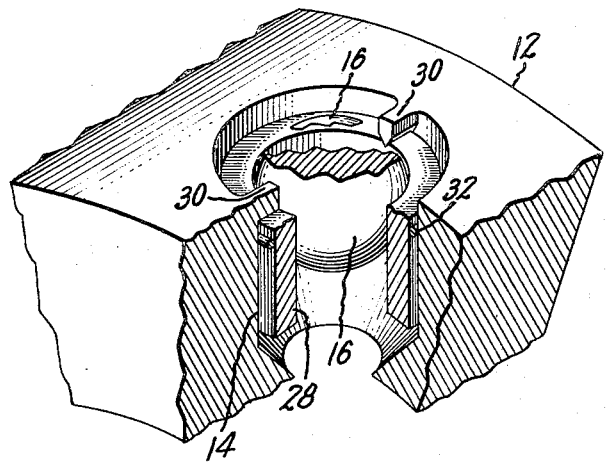
Figure 5:
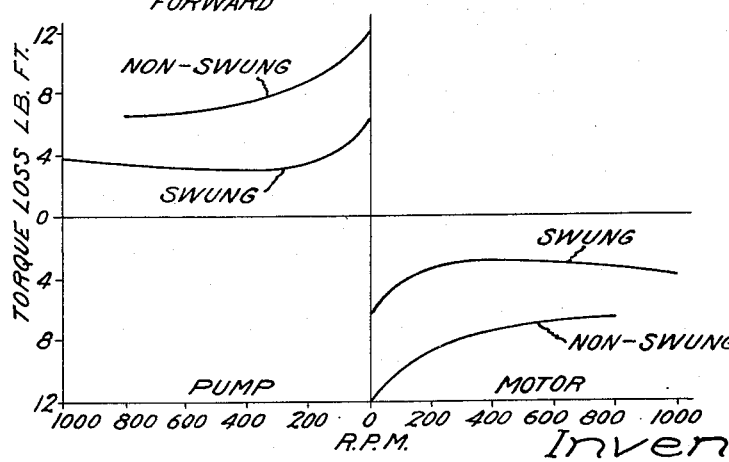

Figure 4 is a perspective view of the preferred embodiment showing a cylinder constructed so as to be free to swing so that at all times the wall forces will be negligible; and Figure 5 is a plot of the torque losses experienced by a typical swung and non-swung radial type hydraulic unit showing the reversal of the torque losses and the steep negative slopes of such losses at the output or B-end zero speed of a hydraulic constant speed drive unit.

Figure 2:
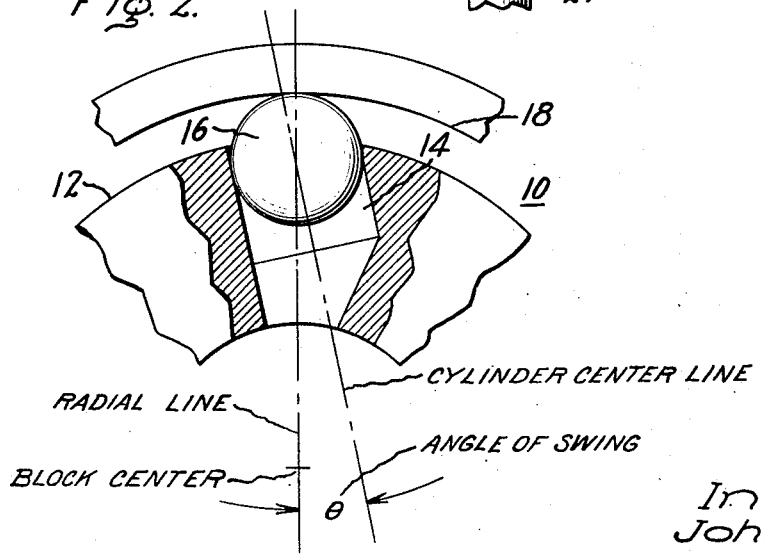
Figure 2 is a sectional view of a portion of the device of Figure 1, illustrating the angle of swing of the cylinders.

Referring now to the drawings, there is illustrated a preferred embodiment comprising a hydraulic ball piston unit 10 which is a simplification of a conventional reciprocating piston, positive displacement pump, having a cylinder block 12 formed with a plurality of precision-ground bores 14 serving as the pumping cylinders. The bores 14, as seen in Figure 2, are formed with their center line at an angle of swing "$\theta$" from the radial line of the cylinder block 12. The cylinder bores contain closely fitted balls 16 which operate as pistons in coaction therewith.

A shaft, not shown, transmits the driving torque to rotate the cylinder block 12 so that centrifugal force plus the pressure furnished by the working fluid beneath the balls holds them in a rolling groove, not shown, of a circular race 18. A pintle 20 serves as the bearing on which the cylinder block 12 rotates and as a valve to port fluid to the pumping cylinders 14. The pintle is provided with internal passages 22 for the high pressure fluid outlet or delivery and port 23 for the low pressure fluid inlet. Stroking pistons 24 and 26 provide a variable fluid delivery from the unit 10 by changing the degree of eccentricity of the race 18 relative to the cylinder block 12 by shifting the race with respect to the pintle 20. The stroking pistons may be controlled by a conventional fly ball governor, not shown, driven mechanically by the output shaft which supplies speed control signals in the form of hydraulic pressure to the stroking pistons. Further, the cylinder bores 14 may be plain or fitted with a liner of, such material as tungsten carbide, or the like, so as to provide better wearing characteristic between the balls 16 and such liners, not shown.

To illustrate the operation of a typical variable displacement unit 10, the action of a ball, such as "A," can be visualized as it proceeds through one complete cycle or revolution of the cylinder block 12. When the cylinder block 12 is rotated by an external force, such as an engine shaft (not shown), in a counterclockwise direction indicated by the arrow, the ball "A" in the bottom cylinder bore moves radially outward, due to centrifugal force, and continues to do so for approximately 180°. During this time, the portion near the top of the cylinder block is opened to the right-hand inlet port and oil is drawn into the cylinder. As the ball "A" completes the first half of the cycle, it passes over the land at the top between the ports, and the cylinder is then opened to the left-hand outlet port. During the remainder of the revolution, the ball is forced radially inward in the cylinder 12 by the race 18, thus forcing the oil from the cylinder into the high-pressure or left-hand outlet.

Figure 1:
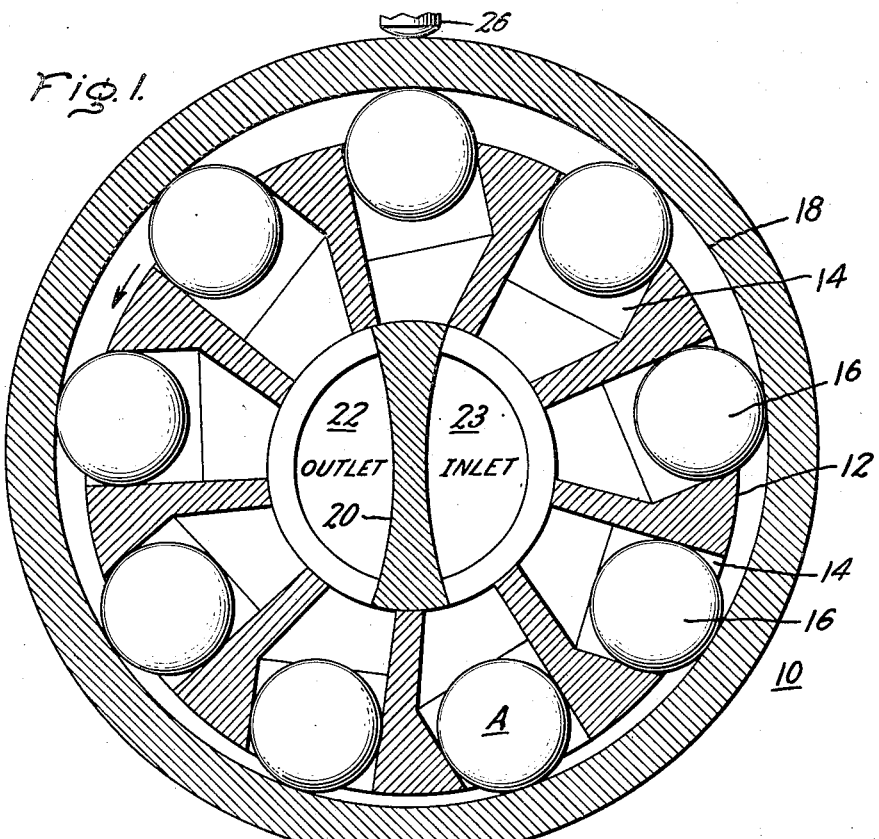
Figure 1 is a cross-sectional view of a single lobe, single bank ball unit with the fixed cylinders set at an angle swung from the center line of the center block.

To change the delivery from the unit 10, all that is necessary is to change the eccentricity of the race 18 by shifting the race with respect to the pintle 20. For example, if the race is concentric with the pintle, there will be no pumping action. In a variable displacement unit 10, as illustrated by the preferred embodiment 10, the degree of eccentricity of the race is varied by means of the stroking pistons 24 and 26. The stroking pistons are used to position the race, as shown in Figure 1, by simply moving the race in an up and down motion. If the eccentricity of the race 18 is opposite to that shown in Figure 1 and the same rotation of the cylinder block 12 is maintained, the direction of the oil flow will be reversed.

If oil is supplied under pressure, the unit 10 will function as a motor. Oil pressure supplied to the right-hand port 23 will force the balls in the right-hand cylinders outward against the race 18 and part of this outward force will be vectorially resolved into a counterclockwise rotating force on the cylinder block 12. After the oil loaded cylinder bores 14 pass the pintle land at the end of the first half of the revolution, their charge of oil is returned to the outlet port 22 by the inward movement of the balls 16 as they run on the race.

By varying the design of the unit 10 slightly, these ball units can be used as either constant displacement or variable displacement pumps and motors. By the suitable combination of pumps and motors, a variety of applications can be met. Due to the simplicity of the ball principle, units can be easily designed and built for special applications. Components are small in size, light in weight, and adaptable to high speeds.

Figure 3:
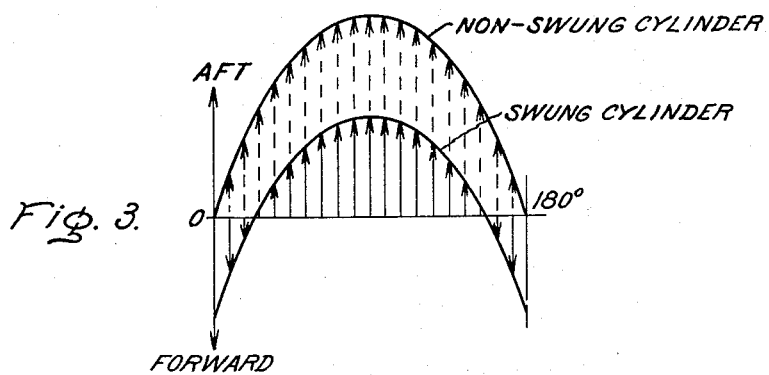
Figure 3 is a typical force diagram over the pressure cycle comparing forces developed in the swung and non-swung cylinder construction at half stroke.

Figure 3 shows a comparison of the cylinder wall forces over the pressure cycle, 0° to 180° displacement, for both the swung and unswing cylinder bores for a full stroke position of the race, as shown in Figure 1. The maximum cylinder wall force on the aft wall is approximately one-half of the value of the wall force on the cylinder in the non-swung position. As can be seen, in the swung cylinders the balls ride forward to more evenly distribute the loading than do the balls in the conventional non-swung unit. The trend in the distribution of the cylinder wall forces, as indicated in Figure 4, for the swung and the non-swung cylinder is carried through the various degrees of stroking from zero to full. The amplitude of the forces, shown in Figure 3, is a function of the fluid pressure and the coefficient of friction between each of the balls 16 and the coacting cylinder wall which vary with various installations.

Figure 4 illustrates a modification of the preferred embodiment of Figure 1, wherein a swinging cylinder 28 is provided within the bore 14 and slightly spaced from the cylinder block 12 so as to be free to swing in response to the loading imposed thereon. The swinging cylinder 28 is pivotally supported within the bore 14 by pivot edges 30 integrally formed with the cylinder block 12. A resilient circular seal 32 is provided between the swinging cylinder 28 and the cylinder block 12 so as to prevent the flow of fluid therethrough. The structural arrangement of the modification of Figure 4 substantially minimizes the overall loading on the cylinder wall since at all times the wall forces will be negligible.

The results of low speed torque loss tests on hydraulic ball piston units with both normal and swung cylinder bores are presented to further illustrate the present invention. The torque loss tests were conducted on a ball piston hydraulic unit operating both as a pump and as a motor through zero speed. The hydraulic unit was first tested with normal radial cylinders, then with five-degree swung cylinder bores. The use of the swung cylinder bores in the hydraulic unit reduced the torque losses to substantially one-half of those of the normal radial cylindered unit. Therefore, the application of swung cylinder bores on the output end, as heretofore mentioned as being commonly called the B-end unit of a constant speed drive, would help in the control characteristics of the drive by reducing the discontinuity and the negative torque gradient at straight-through speed ratios.

Accordingly, the purpose of these tests was to investigate the torque losses in this region of slow and zero speed operation of a ball piston hydraulic unit. This condition of operation occurs in hydraulic constant speed drives near the straight-through speeds, that is, when the unit is going from a pump to a motor operating condition. The reversal of the torque loss and the steep negative slopes of the losses at the output or B-end zero speed tend to cause instability of the drives. The swung cylinder bores, as shown in Figure 5, reduced the torque losses in this region of slow speed operation, and reduced the high side wall force between the ball piston and its cylinder. Since the torque is always in one direction on these units in the constant speed drive, swung cylinder bores are quite practical.

The tests, graphically shown in Figure 5, were made on a ¾ inch piston diameter, nine cylinder, double lobe single bank hydraulic unit at speeds from 1000 R. P. M. as a pump down through zero R. P. M. and then up to 1000 R. P. M. as a hydraulic motor. The test setup was as follows: The ball piston unit and a separate hydraulic pump were hydraulically connected so that both units discharged through a conventional single pressure regulator. After the ball piston unit was brought up to speed and pressure as a pump, the power to an electric motor driving the ball piston unit was gradually decreased causing the ball piston unit to drop in speed and then reverse rotation to operate as a hydraulic motor from oil supplied by the separate hydraulic pump. The torque, speeds, and pressures were recorded and an example of the results is shown in Figure 5, for a 2000 p. s. i. pressure. The curves indicate that the use of the swung cylinder bores reduces the torque loss to nearly one-half.

In summary, the present invention provides a radial type hydraulic unit wherein swung cylinders produce substantially reduced cylinder wall forces, as seen from the plot of Figure 3, and reduces the torque losses to nearly one-half of those in the normal radial cylinder unit. Thus, the disadvantages associated with present-day radial type hydraulic units are substantially minimized and the efficiency of such units is greatly increased and the need for expensive construction materials is greatly reduced.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention as set forth in the appended claim.

What is claimed is:

A radial type hydraulic unit having center fluid port means, block means rotatably and concentrically mounted on said port means, a plurality of fixed apertures circumferentially spaced on said block means, cylinder means pivotally mounted in each of said apertures to freely swing with respect to said apertures in response to the loading thereon, circular race means radially spaced from said block means, a piston coacting with each of said cylinder means and race means adapted to reduce the piston loading in the hydraulic unit to a negligible amount.

References Cited in the file of this patent

UNITED STATES PATENTS

| | | |
|---|---|---|
| 1,325,434 | Carey et al. | Dec. 16, 1919 |
| 2,356,916 | Brewster | Aug. 29, 1944 |
| 2,359,513 | Eden et al. | Oct. 3, 1944 |
| 2,453,538 | Rauch | Nov. 9, 1948 |
| 2,539,571 | Deschamps | Jan. 30, 1951 |
| 2,675,764 | McGee | Apr. 20, 1954 |

FOREIGN PATENTS

| | | |
|---|---|---|
| 594,852 | Great Britain | Nov. 20, 1947 |